United States Patent
Thiele et al.

(10) Patent No.: US 8,436,601 B2
(45) Date of Patent: May 7, 2013

(54) DC-DC CONVERTER WITH AUTOMATIC INDUCTOR DETECTION FOR EFFICIENCY OPTIMIZATION

(75) Inventors: Gerhard Thiele, Dachau (DE); Konrad Wagensohner, Mauern (DE); Josy Bernard, Freising (DE)

(73) Assignee: Texas Instruments Deutschland GmbH, Freising (DE)

(*) Notice: Subject to any disclaimer, the term of this patent is extended or adjusted under 35 U.S.C. 154(b) by 261 days.

(21) Appl. No.: 13/028,034

(22) Filed: Feb. 15, 2011

(65) Prior Publication Data

US 2011/0204860 A1  Aug. 25, 2011

(30) Foreign Application Priority Data

Feb. 23, 2010  (DE) .................. 10 2010 008 943

(51) Int. Cl.
*G05F 1/575*   (2006.01)
*G05F 1/618*   (2006.01)

(52) U.S. Cl.
USPC ......................................... 323/285; 323/284

(58) Field of Classification Search ............... 323/225, 323/282, 284, 285, 351
See application file for complete search history.

(56) References Cited

U.S. PATENT DOCUMENTS

| | | | |
|---|---|---|---|
| 6,329,801 B1 | 12/2001 | Zuniga et al. | |
| 7,652,945 B2 * | 1/2010 | Chu et al. | 365/226 |
| 2010/0283442 A1 * | 11/2010 | Nakashima | 323/283 |
| 2011/0193539 A1 * | 8/2011 | Schmidt et al. | 323/282 |

* cited by examiner

*Primary Examiner* — Gary L Laxton
(74) *Attorney, Agent, or Firm* — William B. Kempler; Wade J. Brady III; Frederick J. Telecky, Jr.

(57) ABSTRACT

A DC-DC converter has high-side power and low-side power transistors connected in series between supply terminals, an inductor connected between the power transistors and an output terminal. A comparator compares the output voltage with a reference voltage. A detector detects when inductor current approaches zero. A timer is configured to determine a minimum ON time of the high-side power transistor optimized for a particular value inductor. A current detector detects current flow in the back-gate diode of the low-side power transistor. timer is configured to determine an overriding ON time in response to the back-gate current detector. Logic provides control signals to gate power transistors in response to the comparator and the longer one of the minimum ON time and the overriding ON time. The minimum ON time for the high-side power transistor is adjusted in response to the actual inductance of the inductor.

18 Claims, 4 Drawing Sheets

DC-DC CONVERTER WITH AUTOMATIC INDUCTOR DETECTION FOR EFFICIENCY OPTIMIZATION

CROSS-REFERENCE TO RELATED APPLICATIONS

This patent application claims priority from German Patent Application No. 10 2010 008 943.5, filed Feb. 23, 2010, which is incorporated herein by reference in its entirety.

FIELD OF THE INVENTION

The invention relates to a DC-DC converter with automatic inductor detection for efficiency optimization.

BACKGROUND OF THE INVENTION

A typical integrated DC-DC buck converter has a high-side power transistor and a low-side power transistor connected in series between supply terminals, and an external inductor connected between the interconnection node of the power transistors, usually referred to as the switch node, and an output terminal to which a load is connected. At low load, the converter enters a power saving mode which reduces the quiescent current consumption and ensures a high conversion efficiency by skipping switch pulses. This power saving mode is referred to as PFM (Pulse Frequency Modulation) mode, or simply "pulse skipping mode". An error comparator compares the output voltage at the output terminal with a reference voltage. When the output voltage drops below the reference voltage, the high-side power transistor is switched on during an ON time of a predetermined minimum duration, the switching frequency depending on the load current. This minimum ON time is determined to optimize converter efficiency for the smallest conceived value of the external inductor in view of the smallest and cheapest overall converter solution, still keeping low the output voltage ripple. Since the minimum ON time is optimized for a particular value of the external inductor, the converter efficiency is less for bigger values of an external inductor. Catalog products such as integrated DC-DC converters must of course be open to a range of external inductor values, but at the price of a lower converter efficiency with inductor values bigger than the small inductor value for which the minimum ON time is optimized.

SUMMARY OF THE INVENTION

In one aspect of the invention, a DC-DC converter has a high-side power transistor and a low-side power transistor connected in series between supply terminals. An inductor is connected between an interconnection node of the power transistors and an output terminal to which a load is connected. A comparator compares the output voltage at the output terminal with a reference voltage. An inductor current detector detects when inductor current approaches zero. A minimum ON timer is configured to determine a minimum ON time of the high-side power transistor optimized for a particular value of the inductor. A back-gate current detector detects current flow in the back-gate diode of the low-side power transistor. An override timer is configured to determine an overriding ON time in response to the back-gate current detector. Control logic provides control signals to gate drivers for the power transistors in response to an output from the comparator and in response to the longer one of the minimum ON time and the overriding ON time. The minimum ON time for the high-side power transistor is adjusted in response to the actual inductance value of a connected inductor. Accordingly, the minimum ON time is automatically extended for bigger values of inductance, whereby the converter efficiency is improved at low load current or, stated otherwise, use of an inductor which is bigger than the smallest inductor for which the converter efficiency is optimized, is possible without loss of efficiency.

In a preferred embodiment, the outputs of the minimum ON timer and the overriding ON timer are simply combined by an AND gate.

Also, in the preferred embodiment, the back-gate current detector includes a common-gate connected transistor the source of which is connected to the interconnection node of the power transistors, also referred to as the switching node. It is thus seen that the existing signal at the switch node is used for sensing when the inductor current is zero. In fact, the negative slope of the inductor current in the inductor discharge phase is smaller for bigger inductors, and so the value of a connected inductor can be determined by sensing when the inductor current reaches zero.

Still further, the overriding ON timer preferably includes a comparator with a first input to which a ramp signal is applied and a second input to which a reference signal is applied; the ramp signal is generated by integrating the input supply voltage and the reference signal is generated by integrating the output voltage at the output terminal of the converter. Thus, the minimum ON time is basically dependent on the ratio between the output voltage and the input voltage. However, by using integrating circuitry with an RC series combination which includes a switch controlled by the back-gate current detector for generating the reference signal, the minimum ON time is also dependent on the negative slope of the inductor discharge current and, therefore, on the value of the inductor.

Further aspects of the invention will appear from the appending claims and from the following detailed description given with reference to the appending drawings.

DETAILED DESCRIPTION OF AN EXAMPLE EMBODIMENT

Figure 1:
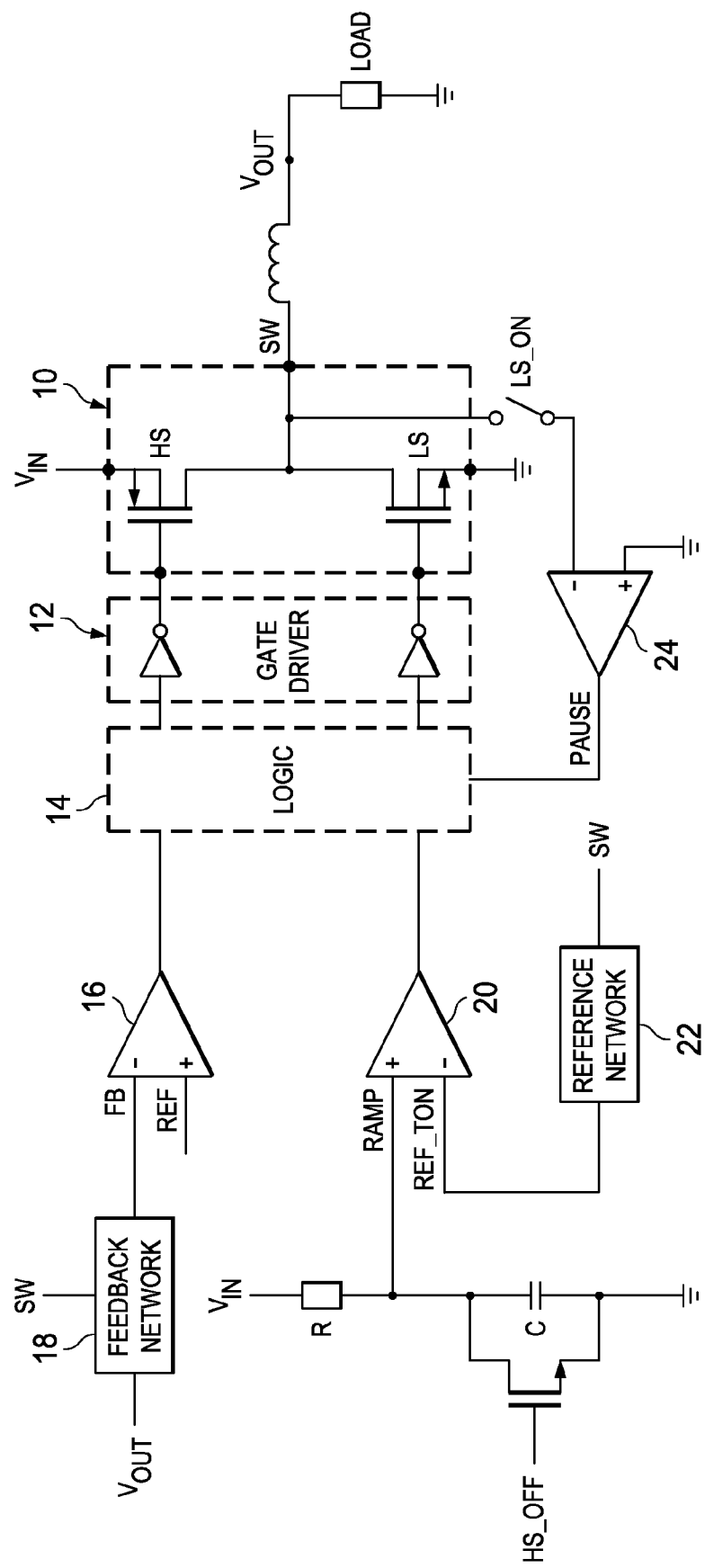
FIG. 1 is a schematic circuit diagram of an integrated DC-DC buck converter.

The DC-DC converter in FIG. 1 is an integrated CMOS circuit with a power stage 10, a gate driver 12 and logic control circuitry 14. The power stage has a high-side PMOS power transistor HS and a low-side NMOS power transistor LS which are connected in series between a supply input voltage Vin and ground. The interconnection node between both transistors is the converter's switch node SW to which an external inductor L is connected at one end, the other end forming an output terminal Vout to which a load is connected. Transistors HS and LS are driven by buffers in the gate driver 12.

A first input to logic control circuitry 14 is an output from an error comparator 16 the inverting input of which receives an internal feedback signal FB and the non-inverting input of which receives an internal reference signal REF. Feedback signal FB is generated by an internal feedback network 18 which has inputs from the switching node SW and output terminal Vout.

A second input to logic control circuitry 14 is an output from a comparator 20 which, on the non-inverting input, receives a ramp signal RAMP and on the inverting input receives a reference signal REF_TON. Ramp signal RAMP is generated by an RC combination connected between supply input Vin and ground and by a transistor switch connected across the capacitor C and controlled by a signal HS_OFF. The reference signal REF_TON is generated by a network 22 which receives an input from switch node SW.

A third input to logic control circuitry 14 is an output from a comparator 24 which has its non-inverting input connected to ground and its inverting input connected to switch node SW through a switch controlled by a signal LS_ON.

When the output voltage at terminal Vout falls below a threshold defined by the internal reference signal REF, the comparator 16 switches transistor HS on. Depending on the load, current transistor HS is switched off either through the comparator 16 or through the output of comparator 20 which is a minimum ON time timer. At light loads comparator 20 defines the on-time of transistor HS to guarantee a low output voltage ripple and good efficiency. The on-time is depending on Vin and, therefore the system offers also a good efficiency in Pulse Skipping Mode. The low-side transistor LS is switched on immediately after high-side transistor HS has been switched off. When the low-side transistor LS is on and the inductor current reaches zero then the comparator 24 will generate a signal called Pause which forces the power stage in high impedance state. This results in single inductor current burst pulses. Additionally the pause signal reduces or switches off the bias current of the various circuit parts in the converter. There is no real transition between continuous and discontinuous mode, the system only skips the inductor current pulses at low load current. When the load current is increased the single burst inductor current pulses come closer together until there is no Pause high signal anymore. Then the system goes ahead with continuous mode. The skip in/out is very smooth, there is no transient change on Vout.

Figure 2:
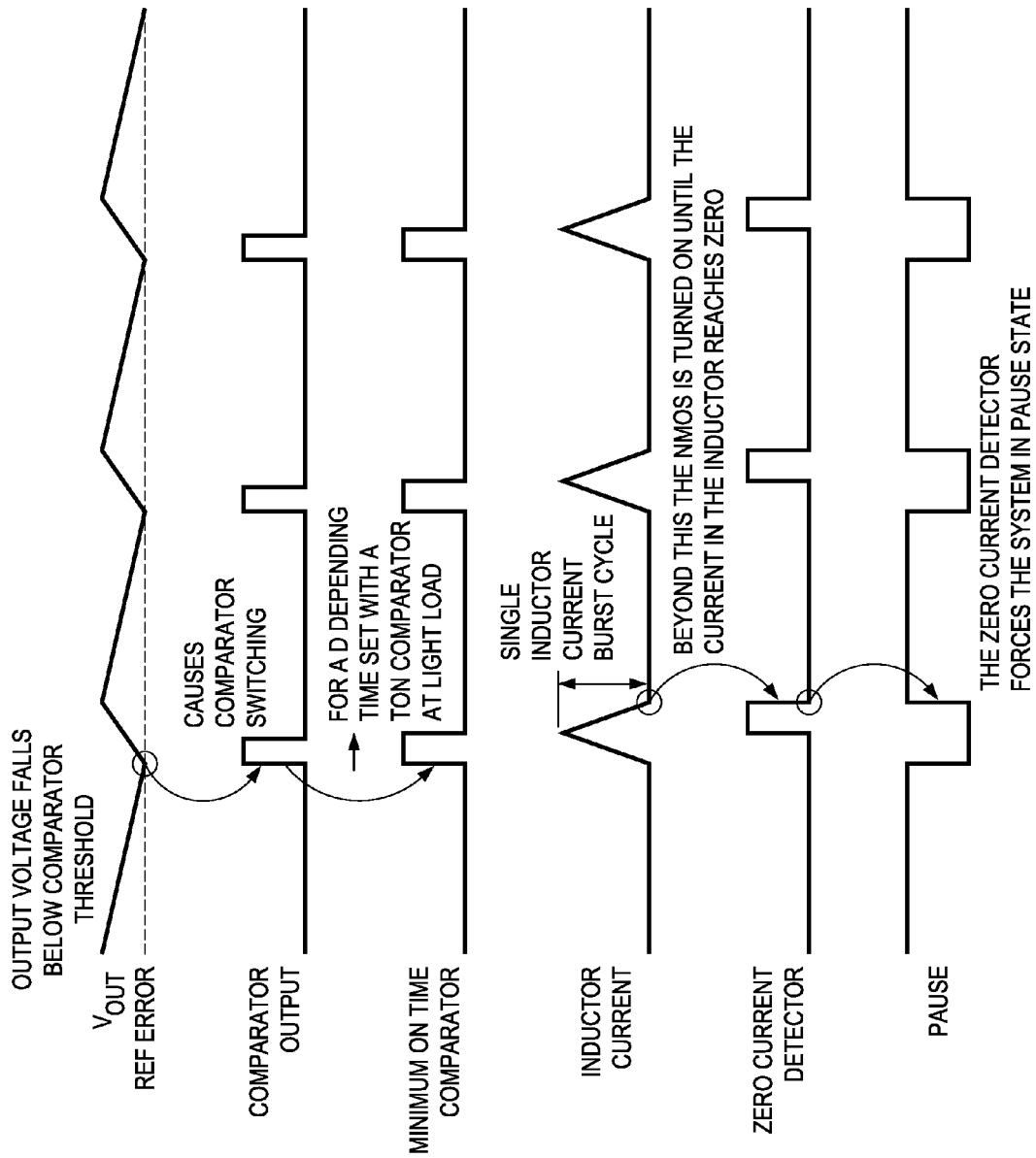
FIG. 2 is a signal diagram illustrating the operation of the converter.

The operation of the converter in the pulse skipping (or pulse frequency modulation) mode is illustrated in FIG. 2. Each time the output voltage Vout falls below the internal reference voltage REF, error comparator 16 switches. At the same time the minimum ON time timer formed by comparator 20 is started and the high-side transistor HS is switched on. The minimum duration for the ON time of high-side transistor HS is determined by the minimum ON time timer. When the high-side transistor HS switches on, the inductor current starts ramping up, and when the transistor HS is switched off and low-side transistor LS is switched on, the inductor current starts ramping down. Comparator 24 detects zero current at switch node SW and generates the Pause signal which acts to turn off low-side transistor LS.

Figure 3:
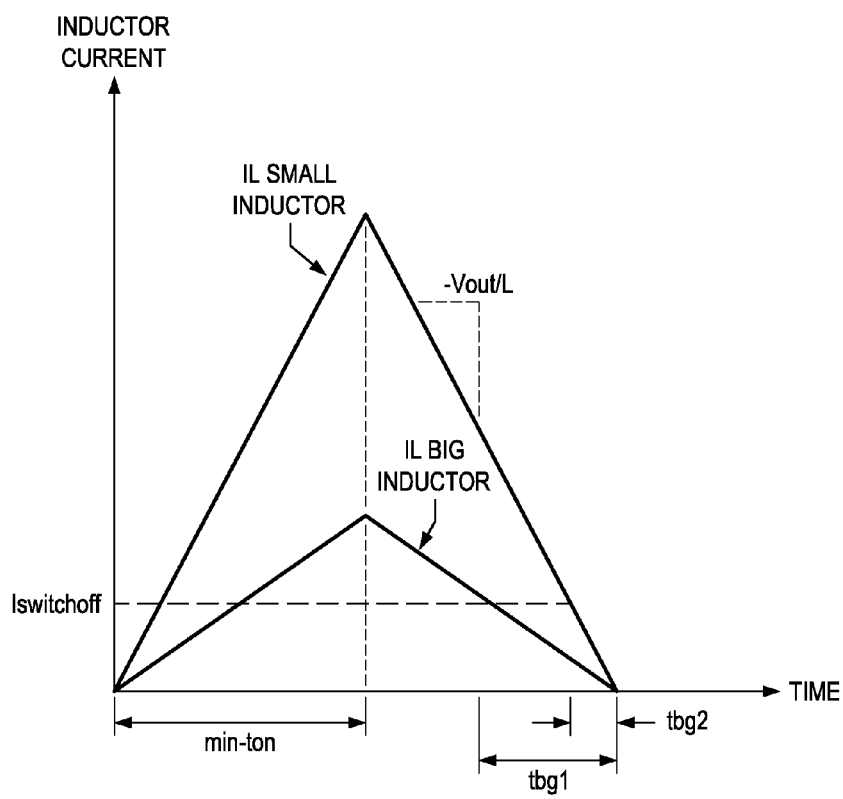
FIG. 3 is a signal diagram showing an inductor current for different values of the inductor.

With reference to FIG. 3, a single inductor current burst is shown for a small inductor and for a large inductor. The inductor current IL ramps up during the ON time of the high-side transistor HS, which is the minimum ON time min-ton. The inductor current ramps down during the ON time of the low-side transistor. As is easy to understand, the positive and negative slopes are much steeper for the small inductor. To avoid negative current and in order to account for internal delays, the low-side transistor LS is switched off at a current Iswitchoff slightly above zero. When the low-side transistor LS is turned off, the back-gate diode of transistor LS is forward biased until no energy is left in the inductor. As seen in the diagram of FIG. 3, the time tbg1 during which the back-gate diode is conductive for the big inductor is much longer than the time tbg2 for the small inductor. Accordingly, by detecting the time of back-gate diode current flow it is possible to determine the value of the connected inductor.

As will be seen, it is possible to detect the back-gate current time, and thus to determine the value of the connected inductor, from the signal at the switch node SW.

Figure 4:
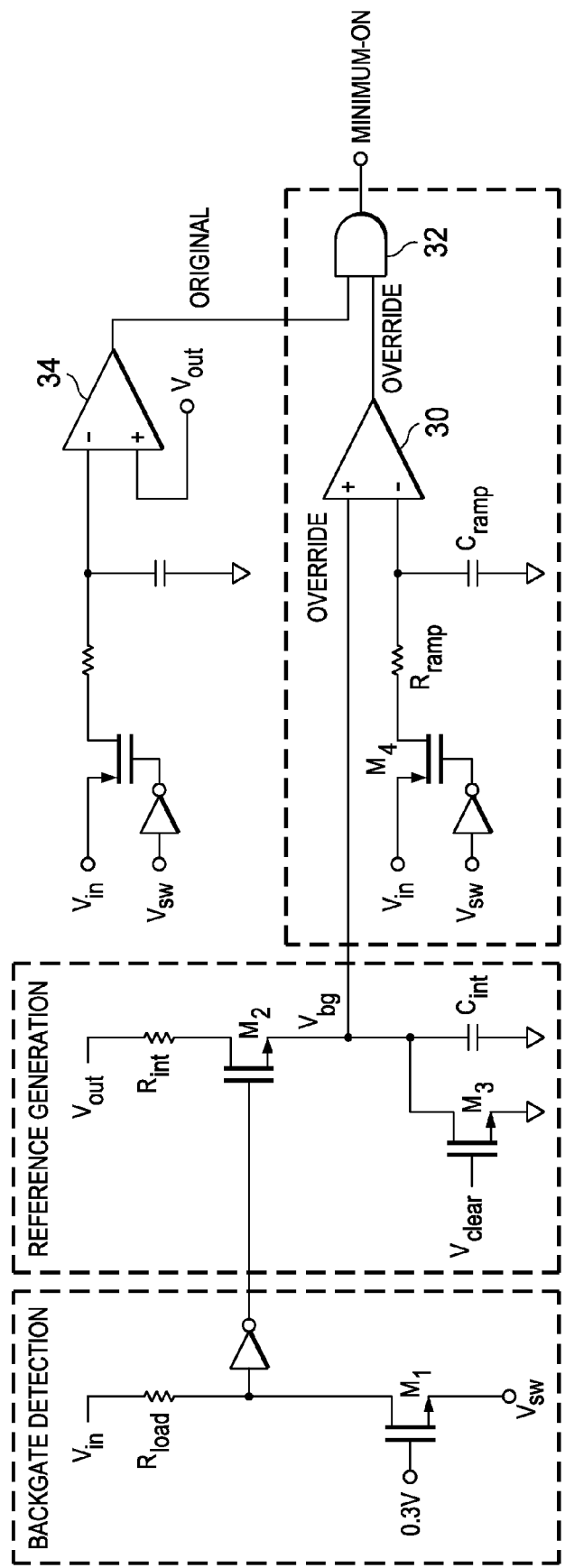
FIG. 4 is a schematic circuit diagram of a modified minimum ON timer.

FIG. 4 shows an exemplary implementation of a timer which generates a minimum ON time signal dependent on the value of the connected inductor based on the detection of the back-gate current.

A first stage is a back-gate current detection stage. That stage has a common gate connected transistor switch M1 connected in series with a resistor Rload between the supply input voltage terminal Vin and the switch node SW. The gate voltage of transistor M1 is determined so that, as soon as the back-gate diode turns on, the negative voltage seen at the switch node SW turns on transistor M1 and, when the back-gate diode is no longer conducting, the transistor M1 is turned off because the gate-source voltage is not high enough. The buffered output of this stage is a rail-to-rail square wave voltage the pulse duration of which equals the time of back-gate conduction.

The second stage is a reference generation stage which is controlled by the output of the back-gate current detection stage. It mainly has an integrating RC series combination with resistor Rint and capacitor Cint and a switch transistor M2 connected between the output terminal Vout and ground, a further switch transistor M3 being connected across capacitor Cint and controlled by a signal Vclear.

The third stage is a timer, referred to as "override" timer" because it can override a conventional minimum ON time signal determined for a relatively small inductor of a predetermined value. The override timer has a comparator 30 with a non-inverting input to which the output voltage Vbg of the reference generation stage is applied, and an inverting input to which a ramp signal is applied. The ramp signal is generated by an integrating RC combination with resistor Rramp and capacitor Cramp, connected in series with a switch transistor M4 between input supply voltage terminal Vin and ground, transistor M4 being controlled by the switch signal at switch node SW. The output of comparator 30 is a timer signal the ON duration of which is dependent on the back-gate current time, and thus the value of the connected inductor, as determined by the back-gate current detection stage.

The override timer also includes an AND gate 32 which combines the "override" output of comparator 30 with an "original" minimum ON time signal received from a timer formed with a comparator 34. The latter "original" timer has integrating circuitry similar to that in the override timer, but the non-inverting input of comparator 34 is connected to output terminal Vout.

In operation, the "original" timer provides minimum ON time signals optimized for a small inductor of e.g. 1 μH. As long as such a small inductor is connected at output terminal Vout, the duration of the output pulses from the override timer is not longer than the duration of the output pulses from the "original" timer. However, when a larger inductor is connected, the duration of the output pulses from the override timer is longer than the duration of the output pulses from the "original" timer, and the AND gate 32 delivers the longer one of the pulses applied to its inputs, so that the output of the override timer is effective.

Although the invention has been described in detail, it should be understood that various changes, substitutions and alterations can be made thereto without departing from the spirit and scope of the invention as defined by the appended claims.

The invention claimed is:

1. A DC-DC converter with a high-side power transistor and a low-side power transistor connected in series between supply terminals to which an input supply voltage is applied, an inductor being connected between an interconnection node of the power transistors and an output terminal to which a load is connected, comprising:
   a comparator comparing the output voltage at the output terminal with a reference voltage;
   an inductor current detector detecting when inductor current approaches zero;
   a minimum ON timer configured to determine a minimum ON time of the high-side power transistor optimized for a particular value of the inductor;
   a back-gate current detector for detecting current flow in the back-gate diode of the low-side power transistor;
   an override timer configured to determine an overriding ON time in response to the back-gate current detector;
   and control logic providing control signals to gate drivers for the power transistors in response to an output from the comparator and in response to the longer one of the minimum ON time and the overriding ON time, whereby the minimum ON time for the high-side power transistor is adjusted in response to the actual inductance value of a connected inductor.

2. The DC-DC converter according to claim 1, wherein the outputs of the minimum ON timer and the overriding ON timer are combined by an AND gate.

3. The DC-DC converter according to claim 1, wherein the back-gate current detector includes a common-gate connected transistor the source of which is connected to the interconnection node of the power transistors.

4. The DC-DC converter according to claim 3, wherein the overriding ON timer includes a comparator having a first input to which a ramp signal is applied and a second input to which a reference signal is applied, the ramp signal being generated by integrating the input supply voltage and the reference signal being generated by integrating the output voltage at the output terminal of the converter.

5. The DC-DC converter according to claim 4, wherein the overriding ON timer for integrating the output voltage uses an RC series combination which includes a switch controlled by the back-gate current detector.

6. The DC-DC converter according to claim 2, wherein the back-gate current detector includes a common-gate connected transistor the source of which is connected to the interconnection node of the power transistors.

7. The DC-DC converter according to claim 6, wherein the overriding ON timer includes a comparator having a first input to which a ramp signal is applied and a second input to which a reference signal is applied, the ramp signal being generated by integrating the input supply voltage and the reference signal being generated by integrating the output voltage at the output terminal of the converter.

8. The DC-DC converter according to claim 6, wherein the overriding ON timer for integrating the output voltage uses an RC series combination which includes a switch controlled by the back-gate current detector.

9. A DC-DC converter with a high-side power transistor and a low-side power transistor connected in series between supply terminals to which an input supply voltage is applied, an inductor being connected between an interconnection node of the power transistors and an output terminal to which a load is connected, comprising:
   a comparator comparing the output voltage at the output terminal with a reference voltage;
   an inductor current detector detecting when inductor current approaches zero;
   a minimum ON timer configured to determine a minimum ON time of the high-side power transistor optimized for a particular value of the inductor;
   a current detector for detecting current flow in a freewheeling diode coupled to the low-side power transistor;
   an override timer configured to determine an overriding ON time in response to the back-gate current detector;
   and control logic providing control signals to gate drivers for the power transistors in response to an output from the comparator and in response to the longer one of the minimum ON time and the overriding ON time, whereby the minimum ON time for the high-side power transistor is adjusted in response to the actual inductance value of a connected inductor.

10. The DC-DC converter according to claim 1, wherein the outputs of the minimum ON timer and the overriding ON timer are combined by an AND gate.

11. The DC-DC converter according to claim 1, wherein the back-gate current detector includes a common-gate connected transistor the source of which is connected to the interconnection node of the power transistors.

12. The DC-DC converter according to claim 3, wherein the overriding ON timer includes a comparator having a first input to which a ramp signal is applied and a second input to which a reference signal is applied, the ramp signal being generated by integrating the input supply voltage and the reference signal being generated by integrating the output voltage at the output terminal of the converter.

13. The DC-DC converter according to claim 4, wherein the overriding ON timer for integrating the output voltage uses an RC series combination which includes a switch controlled by the back-gate current detector.

14. A method of operating a DC-DC converter having a high-side power transistor and a low-side power transistor connected in series between supply terminals to which an input supply voltage is applied, an inductor being connected between an interconnection node of the power transistors and an output terminal to which a load is connected, comprising:
   comparing the output voltage at the output terminal with a reference voltage;
   detecting when inductor current approaches zero;
   determining a minimum ON time of the high-side power transistor optimized for a particular value of the inductor;
   detecting current flow in a diode coupled to the low-side power transistor;
   determining an overriding ON time in response to the back-gate current detector; and
   providing control signals to gate drivers for the power transistors in response to an output from the comparator and in response to the longer one of the minimum ON time and the overriding ON time, whereby the minimum ON time for the high-side power transistor is adjusted in response to the actual inductance value of a connected inductor.

15. The method according to claim 14, wherein the minimum ON time and the overriding ON time are combined by an AND gate.

16. The method according to claim 14, wherein diode is a back-gate diode and a back-gate current detector includes a common-gate connected transistor the source of which is connected to the interconnection node of the power transistors.

17. The method according to claim 15, wherein the overriding ON time includes comparing a first input to which a ramp signal is applied and a second input to which a reference signal is applied, integrating the input supply voltage to generate the ramp signal and integrating the output voltage at the output terminal of the converter to generate the reference signal.

18. The method according to claim 14, wherein determining the overriding ON time includes integrating the output voltage by an RC series combination which includes a switch controlled by the back-gate current detector.

* * * * *